(12) United States Patent
Seki et al.

(10) Patent No.: US 12,544,703 B2
(45) Date of Patent: Feb. 10, 2026

(54) AIR FILTER

(71) Applicant: NIPPON MUKI CO., LTD., Tokyo (JP)

(72) Inventors: Kazuya Seki, Tochigi (JP); Shiro Hayashi, Ibaraki (JP); Takeki Yamaguchi, Tochigi (JP)

(73) Assignee: NIPPON MUKI CO., LTD., Tokyo (JP)

( * ) Notice: Subject to any disclaimer, the term of this patent is extended or adjusted under 35 U.S.C. 154(b) by 771 days.

(21) Appl. No.: 17/777,912

(22) PCT Filed: Nov. 20, 2020

(86) PCT No.: PCT/JP2020/043506
§ 371 (c)(1),
(2) Date: May 18, 2022

(87) PCT Pub. No.: WO2021/100873
PCT Pub. Date: May 27, 2021

(65) Prior Publication Data
US 2022/0401871 A1    Dec. 22, 2022

(30) Foreign Application Priority Data

Nov. 21, 2019 (JP) ............................. 2019-210815
Dec. 24, 2019 (JP) ............................. 2019-232222
(Continued)

(51) Int. Cl.
*B01D 53/02* (2006.01)
*B01D 46/00* (2022.01)
(Continued)

(52) U.S. Cl.
CPC ....... *B01D 46/523* (2013.01); *B01D 46/0002* (2013.01); *F16J 15/14* (2013.01); *F24F 8/108* (2021.01); *B01D 2271/022* (2013.01)

(58) Field of Classification Search
CPC ............ B01D 46/0002; B01D 46/0097; B01D 46/523; B01D 46/521; B01D 2271/022
(Continued)

(56) References Cited

U.S. PATENT DOCUMENTS

| | | | | |
|---|---|---|---|---|
| 3,659,719 A | * | 5/1972 | Westlin | ................ B01D 46/523 55/497 |
| 4,199,387 A | * | 4/1980 | Hladik | ................ B01D 46/523 55/497 |

(Continued)

FOREIGN PATENT DOCUMENTS

| | | |
|---|---|---|
| JP | 8-187411 A | 7/1996 |
| JP | 9-262424 A | 10/1997 |

(Continued)

OTHER PUBLICATIONS

Extended European Search Report in counterpart application No. EP 20889064.0, dated Aug. 16, 2023.
(Continued)

*Primary Examiner* — Christopher P Jones
(74) *Attorney, Agent, or Firm* — Greenblum & Bernstein, P.L.C.

(57) ABSTRACT

An air filter includes: a pleated filter material folded into a zig-zag form at folding lines along a first direction to have peak parts and valley parts arising alternately in a second direction perpendicular to the first direction, trapping fine particles in a gaseous matter flowing in a gas flow direction perpendicular to the first direction and the second direction; a filter frame being a rectangular filter frame including one pair of first frame materials facing each other in the second direction having end parts in the first direction, and one pair of second frame materials facing each other in the first direction having end parts in the second direction, opening in the gas flow direction and housing the pleated filter material, each of the first frame materials and each of the
(Continued)

second frame materials being combined to provide an overlap part.

6 Claims, 10 Drawing Sheets

(30) Foreign Application Priority Data

| Jan. 9, 2020 | (JP) | 2020-002170 |
|---|---|---|
| Mar. 18, 2020 | (JP) | 2020-048208 |
| Mar. 26, 2020 | (JP) | 2020-056458 |

(51) Int. Cl.
  *B01D 46/52* (2006.01)
  *F16J 15/14* (2006.01)
  *F24F 8/108* (2021.01)

(58) Field of Classification Search
  USPC .................................. 55/497, 498, 502, 521
  See application file for complete search history.

(56) References Cited

U.S. PATENT DOCUMENTS

| 4,885,015 | A | | 12/1989 | Goulet et al. | |
|---|---|---|---|---|---|
| 5,639,287 | A | * | 6/1997 | Van de Graaf | B01D 46/521 55/501 |
| 6,319,300 | B1 | * | 11/2001 | Chen | B01D 46/10 55/497 |
| 6,406,509 | B1 | * | 6/2002 | Duffy | B01D 46/0001 55/497 |
| 6,521,011 | B1 | * | 2/2003 | Sundet | B01D 46/523 55/497 |
| 6,740,136 | B2 | * | 5/2004 | Duffy | B01D 29/031 55/497 |
| 8,163,054 | B1 | * | 4/2012 | McGrath | B01D 46/10 55/497 |
| 2004/0040268 | A1 | * | 3/2004 | Wastijn | B01D 46/24 55/282.3 |
| 2005/0126138 | A1 | * | 6/2005 | Anderson | B01D 46/521 55/498 |
| 2006/0090433 | A1 | * | 5/2006 | Stahl | B01D 46/10 55/497 |
| 2007/0084168 | A1 | * | 4/2007 | Ashwood | F24F 13/28 55/501 |
| 2007/0294988 | A1 | * | 12/2007 | Miller | B01D 46/0002 55/501 |
| 2009/0077937 | A1 | * | 3/2009 | Privitt | B01D 46/0002 55/493 |
| 2009/0301044 | A1 | * | 12/2009 | Miller | B01D 46/0005 55/475 |
| 2011/0219737 | A1 | * | 9/2011 | Sudermann | B01D 46/10 55/497 |
| 2012/0317944 | A1 | * | 12/2012 | Lise | B01D 46/0001 55/501 |
| 2015/0267927 | A1 | * | 9/2015 | Zhang | B01D 46/521 55/497 |

FOREIGN PATENT DOCUMENTS

| JP | 2002-166113 | A | 6/2002 |
|---|---|---|---|
| JP | 2009-220050 | A | 10/2009 |
| JP | 2009-247963 | A | 10/2009 |
| JP | 2012-091071 | A | 5/2012 |
| JP | 2014-217814 | A | 11/2014 |
| JP | 2016-182587 | A | 10/2016 |

OTHER PUBLICATIONS

International Search Report issued in International Bureau of WIPO Patent Application No. PCT/JP2020/043506, dated Jan. 26, 2021, along with an English translation thereof.

Japanese Office Action in counterpart application No. JP 2019-232222, dated Jul. 4, 2023, and English translation thereof.

* cited by examiner

AIR FILTER

TECHNICAL FIELD

The present invention relates to an air filter.

BACKGROUND ART

For example, PTL 1 describes a filter with a lug. The filter with a lug prevents occurrence of air leak caused by the gap between the filter and the filter frame. In the filter with a lug, the lug parts bonded to both ends of the filter are held and fixed between the filter frame and the prefilter frame. According to the configuration, no gap is formed between the filter and the filter frame, so as to prevent the occurrence of air leak.

CITATION LIST

Patent Literature

PTL 1: JPH7-112107A

SUMMARY OF INVENTION

Technical Problem

The filter with a lug of PTL 1 has a lug part in the direction along the folding lines of the filter. Therefore, the occurrence of gaps on the left and right side surfaces on the upstream side of the filter frame can be prevented, but it is difficult to prevent air leak occurring at the corner part, which is the seam part of the upper or lower frame and the left or right frame of the filter frame.

The present invention has been made in consideration of the circumstances, and an object thereof is to provide an air filter that is capable of preventing air leak occurring at the corner part of the filter frame.

To solve the above problem, the air filter according to the present invention includes: a pleated filter material folded into a zig-zag form at folding lines along a first direction to have peak parts and valley parts arising alternately in a second direction perpendicular to the first direction, trapping fine particles in a gaseous matter flowing in a gas flow direction perpendicular to the first direction and the second direction; a filter frame being a rectangular filter frame including one pair of first frame materials facing each other in the second direction having end parts in the first direction, and one pair of second frame materials facing each other in the first direction having end parts in the second direction, opening in the gas flow direction and housing the pleated filter material, each of the first frame materials and each of the second frame materials being combined to provide an overlap part where each of the end parts of each of the first frame materials and each of the end parts of each of the second frame materials overlap each other; and a buffer material disposed between at least each of the second frame materials of the filter frame and the pleated filter material, held with the overlap part.

Advantageous Effects of Invention

The air filter according to the present invention can prevent air leak occurring at the corner part of the filter frame.

DESCRIPTION OF THE EMBODIMENTS

A first embodiment of the air filter according to the present invention will be described with reference to the drawings.

Figure 1:
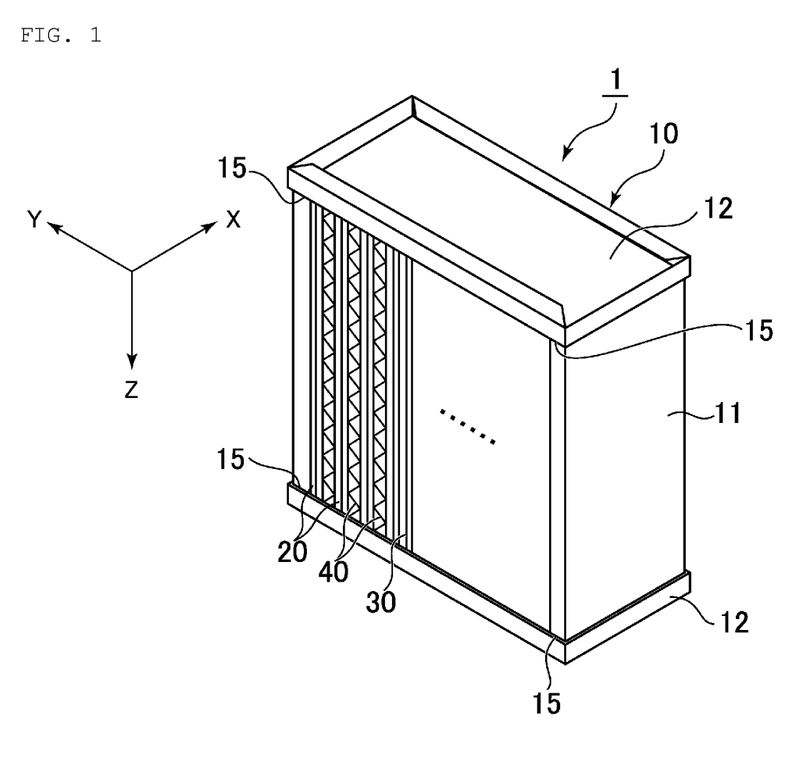
FIG. 1 is a perspective view of an air filter according to the present embodiment.

FIG. 1 is a perspective view of an air filter 1 according to the present embodiment.

Figure 2:
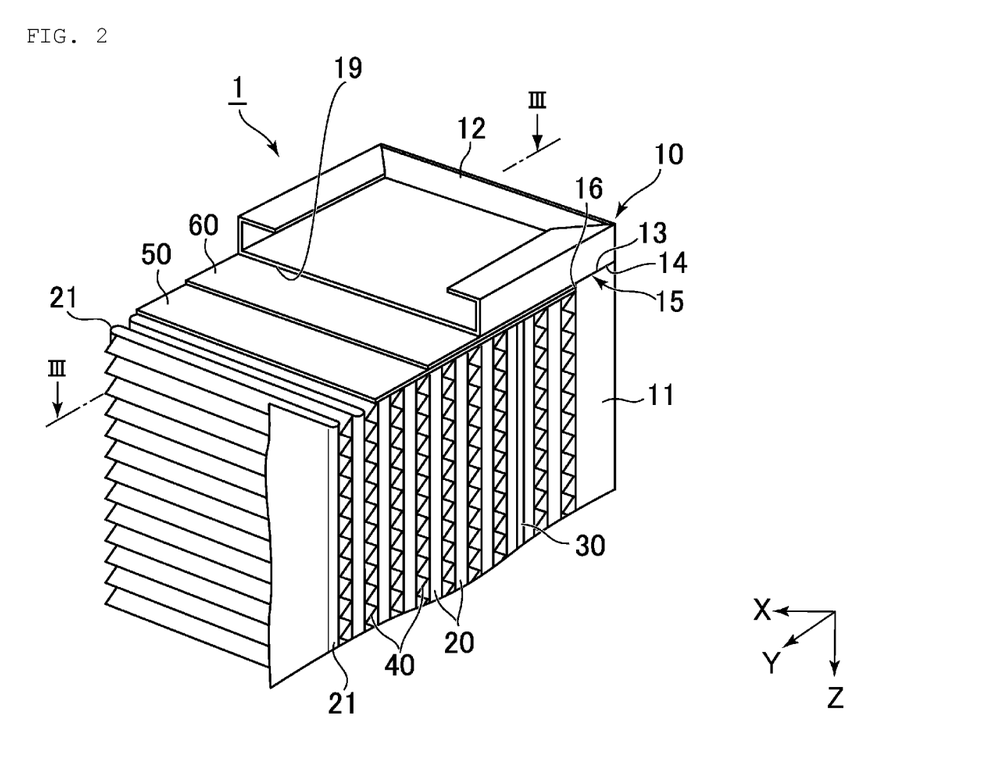
FIG. 2 is a partial cross sectional view of the air filter.

FIG. 2 is a partial cross sectional view of the air filter 1.

Figure 3:
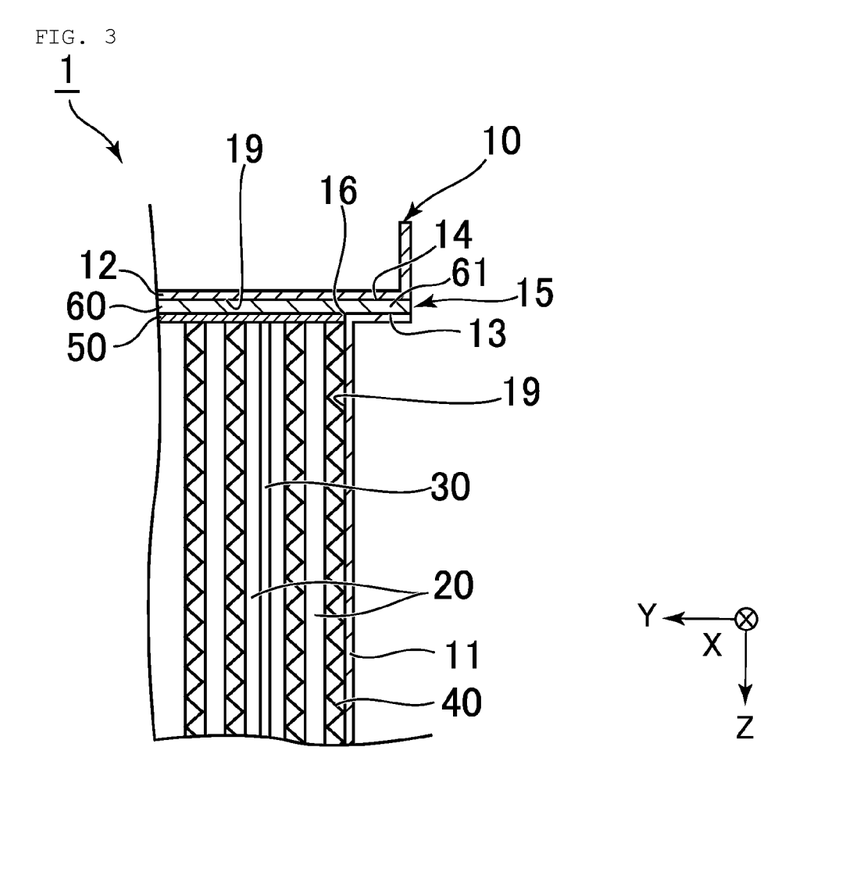
FIG. 3 is a cross sectional view on the line III-III in FIG. 2.

FIG. 3 is a cross sectional view on the line III-III in FIG. 2.

In the following description, the X direction in FIGS. 1 to 11 is designated as a gas flow direction. The Z direction is designated as a vertically downward direction, and the inverse direction to the Z direction is designated as a vertically upward direction. The Y direction is designated as a horizontally leftward direction, and the inverse direction to the Y direction is designated as a horizontally rightward direction.

The air filter 1 has a performance, for example, of a HEPA (high efficiency particulate air) filter. A HEPA filter is a filter that has a trapping efficiency of 99.97% or more at a rated air capacity to particles having a particle diameter of 0.3 μm, and an initial pressure loss of 245 Pa or less. The air filter 1 can be applied to various purposes of cleaning a gas at a high temperature. The air filter 1 is applied, for example, to cleaning of an exhaust gas discharged from an incinerator and cleaning of air in a drying furnace for drying components used in a semiconductor production process and a sterilization furnace for sterilizing medical devices. The air filter 1 is installed, for example, in midstream of a flow channel for a gas flow connected to the aforementioned furnace in incineration facilities, semiconductor production facilities, hospitals, research facilities, and the like.

The air filter 1 includes a filter frame 10, a pleated filter material 20, a reinforcing plate 30, a separator 40, a seal material 50, and a buffer material 60.

The filter frame 10 is a rectangular frame member that opens in the gas flow direction and houses the pleated filter material 20. The filter frame 10 is constituted by combining one pair of first frame materials 11 and one pair of second frame materials 12. The first frame materials 11 face each other in the horizontal direction (second direction) and have end parts 13 in the vertical direction (first direction). The second frame materials 12 face each other in the vertical direction and have end parts 14 in the horizontal direction.

The filter frame 10 has four overlap parts 15 where each of the end parts 13 of each of the first frame materials 11 and each of the end parts 14 of each of the second frame materials 12 overlap each other, so as to combine the first frame material 11 and the second frame material 12. The first frame material 11 and the second frame material 12 are in contact directly or indirectly with each other in each of the overlap parts 15.

The first frame material 11 and the second frame material 12 are connected and fixed with a connecting means, such as a bolt, in each of the overlap parts 15, so as to constitute the filter frame 10.

The filter frame 10 is preferably formed of a material having heat resistance. The filter frame 10 is formed, for example, of a metal, such as stainless, a stainless steel (such as SUS304 and SUS430), aluminum, an aluminum alloy, a steel, and ceramics. The stainless may be plated with zinc or aluminum. The filter frame 10 may include a film formed through an alumite treatment, a chromate treatment, or the like.

The pleated filter material 20 traps fine particles in a gaseous matter flowing in the gas flow direction. The pleated filter material 20 is formed by folding a filter material in a sheet form into a zig-zag form, and has peak parts and valley parts. The pleated filter material 20 has folding lines 21 along the vertical direction. The folding lines 21 form the peak parts and the valley parts appearing alternately in the horizontal direction. The pleated filter material 20 is disposed in the filter frame 10 in such a manner that the peak parts and the valley parts appear on the upstream side and the downstream side of the gas flow, respectively.

The pleated filter material 20 is, for example, a fibrous material formed of glass fibers, silica fibers, or mixed fibers thereof. The pleated filter material 20 has, for example, such a form as a nonwoven fabric, paper, a cotton-like material, or a mat. Specifically, the pleated filter material 20 may be formed of a glass nonwoven fabric, glass paper, glass wool, or the like formed of glass fibers. The pleated filter material 20 may contain a binder for adhering the fibers. The pleated filter material 20 may be held and supported between two sheets of breathable supports having heat resistance (such as metal meshes).

Figure 4:
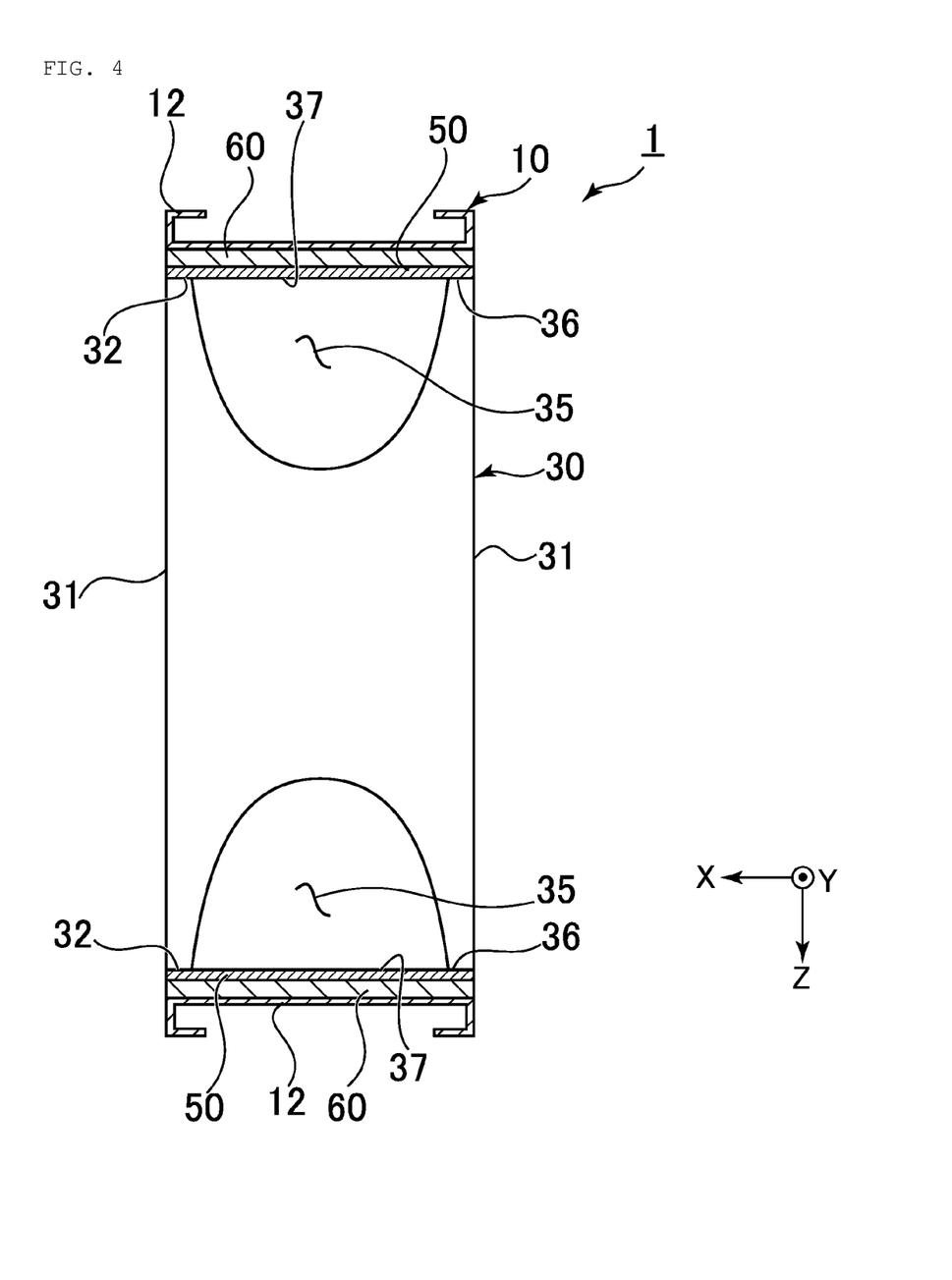
FIG. 4 is a cross sectional view of the air filter along the vertical direction for describing a reinforcing plate.

The reinforcing plate 30 is a flat plate having an approximately rectangular shape. The reinforcing plate 30 is inserted between the peak parts adjacent to each other of the pleated filter material 20, i.e., inserted to the valley part thereof. The reinforcing plate 30 supports the positions in the vertical direction of the pleated filter material 20 and the other members. Specifically, the reinforcing plate 30 prevents the pleated filter material 20 and the separator 40 from being deformed (such as deviation and turnover) due to heat and from being deformed in the case where a physical force is applied thereto. FIG. 4 is a cross sectional view of the air filter 1 along the vertical direction for describing the reinforcing plate 30.

The reinforcing plate 30 has one pair of edges 31 along the vertical direction and one pair of edges 32 along the gas flow direction. The lengths of the one pair of edges 31 along the vertical direction are approximately the same as the vertical length of the pleated filter material 20. The reinforcing plate 30 is inserted to at least a part of the valley part of the pleated filter material 20. The reinforcing plate 30 is disposed at a prescribed position of the air filter 1, and a necessary number of plies of the reinforcing plates 30 may be disposed.

The reinforcing plate 30 has a thickness, for example, of 0.3 to 2.0 mm. The reinforcing plate 30 is formed, for example, of a metal. The reinforcing plate 30 that is formed of a metal supports the weight of the seal material 50 positioned upward, and prevents the seal material 50 from falling off. The thermal expansion coefficients (linear thermal expansion coefficients or linear expansion coefficients) of the reinforcing plate 30 and the filter frame 10 are preferably the same as each other. According to the configuration, for example, the breaking of the seal material 50 and the air filter 1 due to the effect of thermal expansion can be reduced.

In the case where the air filter 1 is used in a high temperature range as in a sterilization furnace or the like, the air filter 1 is exposed to a severe temperature change between stoppage and operation of the sterilization furnace. Under the repetition of the temperature change, the fibers of the seal material 50 are wasted to form a gap between the reinforcing plate 30 and the second frame material 12, which may cause leak. For that problem, the air filter 1 has cutout parts 35 for the purpose of suppressing the occurrence of leak. The cutout parts 35 are formed on one pair of edges 32 along the gas flow direction, and each have a semicircular shape having an area increasing from both ends toward the center of each of the one pair of edges 32 along the gas flow direction. According to the configuration, the one pair of edges 32 along the gas flow direction each have contact parts 36 and a non-contact part 37 with respect to the seal material 50. The contact parts 36 are formed on both the sides of the ends of the one pair of edges 32, and each are formed to have a width of 3 to 20 mm. The non-contact part 37 is the other part than the contact parts 36. The cutout parts 35 reduce the part where the reinforcing plate 30 comes into contact with the seal material 50.

In the case where the cutout parts 35 are not provided, it is considered that the reinforcing plate 30 expands in the vertical direction and the gas flow direction through thermal expansion. In a large expansion thereof in the vertical direction, the reinforcing plate 30 thrusts the seal material 50, and thereby the seal material 50 tends to crack. In the case where the cutout parts 35 are provided, however, the elongation direction through thermal expansion of the reinforcing plate 30 can be diffused to reduce the elongation in the vertical direction. According to the mechanism, the thrust of the reinforcing plate 30 through thermal expansion onto the seal material 50 can be reduced to prevent the breaking of the seal material 50. Accordingly, even on repeated application of a high temperature, the reinforcing plate 30 suppresses the seal material 50 from being cracked, and prevents the leak from occurring.

The separator 40 is a member retaining the gap (valley part) between the peak parts adjacent to each other of the pleated filter material 20. The separator 40 is formed, for example, of a metal, such as aluminum and a stainless steel. The separator 40 is preferably formed of aluminum or an aluminum alloy for weight reduction. The separator 40 has a thickness, for example, of 25 to 65 μm. The separator 40 is formed through corrugation where the material is folded into a wave shape. The separator 40 is inserted to each of the other valley parts than the valley part having the reinforcing plate 30 inserted thereto among the valley parts of the pleated filter material 20, in such a manner that the folding lines thereof are along the gas flow direction. The separator 40 has approximately the same vertical length as the vertical length of the pleated filter material 20.

The seal material 50 (first and second seal materials) seals between at least a part of an inner surface 19 of the filter frame 10 (surface facing inward the air filter 1) and a part of the pleated filter material 20 facing that part. In the air filter 1 of the present embodiment, the seal material 50 seals between each of the second frame materials 12 and the pleated filter material 20. The pleated filter material 20 can come into surface contact with each of the first frame materials 11 through thrust of the separator 40, but comes into line contact with each of the second frame materials 12, failing to achieve surface contact. For preventing the leak between each of the second frame materials 12 and the pleated filter material 20, the seal material 50 is preferably provided between each of the second frame materials 12 and the pleated filter material 20. Due to the seal material 50 provided, the air filter 1 can exert a higher leak prevention effect than the case where only the buffer material 60 is provided between the filter frame 10 and the pleated filter material 20.

For suppressing the breaking of the seal material 50 due to the difference in thermal expansion amount from the filter frame 10 in the case where the air filter 1 is used in a high temperature range, it is considered to form the seal material 50 with a ceramic material that is regulated to have the same linear thermal expansion coefficient as the linear thermal expansion coefficient of the filter frame 10. However, the degree of freedom in selecting the material of the seal material 50 is restricted thereby. Furthermore, there are cases where materials that have the same linear expansion coefficient in a certain temperature range have different linear thermal expansion coefficients in another temperature range, and there is a concern that the difference in thermal expansion amount cannot be suppressed consequently. Moreover, in the case where a ceramic material having a linear expansion coefficient that is different from the linear expansion coefficient of the filter frame 10 is used as the seal material 50, there is a concern that in the case where the air filter 1 is used at a high temperature, cracks occur on the surface of the seal material 50, and fine particles of the seal material 50 are released from the cracks and flow downstream.

The seal material formed of a ceramic material is generally obtained by coating a ceramic material in the form of paste on the filter material, followed by sintering. The present inventors have found that cracks of the seal material are formed in sintering the ceramic material, and dust emission from the ceramic material in use occurs due to the cracks. It has also been found that the dust emission from the seal material can be suppressed by using the following material as the seal material 50.

The seal material 50 is formed of a ceramic material that has a ratio of the linear expansion coefficient (JIS R1618: 2002) of the seal material 50 in a temperature range of 200 to 500° C. of 10 to 200% with respect to the linear expansion coefficient (JIS Z2285:2003) of the filter frame 10 in that temperature range. Examples of the ceramic material include materials containing silica, alumina, and zirconia. It is preferred that the ceramic material does not contain crystalline silica (such as cristobalite) from the standpoint of preventing a carcinogenic material from being contained therein.

The seal material 50 is formed, for example, by sintering a ceramic material in the form of paste or liquid. The seal material 50 of this type may have thereinside cracks occurring in sintering the ceramic material in some cases. The cracks have an effect of relaxing the stress inside the seal material 50 to suppress cracks newly occurring in use. In the case where the cracks do not reach the surface of the seal material 50, dust emission therefrom does not occur in use, and therefore even when the seal material 50 has cracks thereinside, the air filter 1 can be used.

It is preferred that the ceramic material of the seal material 50 does not contain crystalline silica, contains amorphous silica and alumina, and is formed by sintering a ceramic material in the form of paste having a viscosity at room temperature (23° C.) of 20,000 to 50,000 mPa·s. The crystalline silica is silica having a crystal structure of $SiO_2$. The amorphous silica is silica having no crystal structure of $SiO_2$. The ceramic material does not contain crystal silica, but contains amorphous silica or alumina, thereby facilitating the regulation of the thermal expansion coefficient of the seal material 50. The ceramic material has a viscosity at room temperature in the aforementioned range, and thereby is prevented from penetrating to the interior of the buffer material 60 before sintering. Accordingly, the function of the buffer material 60 described later allowing the seal material 50 to expand or contract after sintering can be favorably exhibited.

The ceramic material having a viscosity in the aforementioned range at room temperature can be readily coated to a uniform thickness on the filter frame 10, and thereby the sintered seal material 50 can be suppressed from suffering unevenness in thickness and formation of pores. The components of the ceramic material in the form of paste except for water preferably contain amorphous silica and alumina in an amount of 50% by mass or more. The viscosity thereof at room temperature is preferably 25,000 to 45,000 mPa·s.

The temperature range of 200 to 500° C. is a temperature range of the atmosphere where the air filter 1 can be used. The temperature range is preferably 300 to 400° C. It suffices that the atmospheric temperature in use of the air filter 1 has the maximum temperature in the aforementioned temperature range, and for example, may be less than 200° C. at the beginning of use. The ratio of the linear expansion coefficient of the seal material 50 with respect to the linear expansion coefficient of the filter frame 10 described above is calculated from the linear expansion coefficients of the filter frame 10 and the seal material 50 at the same temperature within the aforementioned temperature range. In the present embodiment, the ratio is 10 to 200%, and thereby the degree of freedom in selecting the combination of the filter frame 10 and the seal material 50 is enhanced. In the case where the ratio exceeds 200%, the thermal expansion of the seal material 50 along the filter frame 10 (along the horizontal direction, which is the longitudinal direction of the seal material 50) is restricted by each of the first frame materials 11, and thereby the compression stress is increased to cause a concern of breaking. In the case where the ratio is less than 10%, the seal material 50 is pulled due to the too large thermal expansion amount of the filter frame 10 even though the buffer material 60 is provided, and thereby there is a concern that the cracks formed inside the seal material 50 proceed and appear on the surface of the seal material 50. In the case where the cracks exist on the surface of the seal material 50, fine particles of the seal material 50 are released from the wall surface in the cracked part of the seal material 50 in use of the air filter 1, and contaminate the gaseous matter passing through the air filter 1 to the downstream side. The aforementioned ratio is preferably 50 to 150%.

The linear expansion coefficient of the seal material 50 may be larger than the linear expansion coefficient of the filter frame 10, may be equal to the linear expansion coefficient of the filter frame 10, or may be smaller than the linear expansion coefficient of the filter frame 10. In the case where the linear expansion coefficient of the seal material 50 is larger than the linear expansion coefficient of the filter frame 10, the thermal expansion of the seal material 50 in the longitudinal direction (horizontal direction) is restricted with an appropriate force of each of the first frame materials 11, which makes it difficult for the cracks of the seal material 50 to proceed. Therefore, the linear expansion coefficient of the seal material 50 is preferably larger than the linear expansion coefficient of the filter frame 10.

Although the degree of freedom in selecting the combination of the filter frame 10 and the seal material 50 is enhanced, there are cases where the difference in thermal expansion amount between the filter frame 10 and the seal material 50 is increased depending on the selected combination thereof. However, the seal material 50 can expand or contract relative to the filter frame 10, and thereby the cracks inside the seal material 50 can be suppressed from proceeding. Consequently, the dust emission can be effectively suppressed.

The linear expansion coefficient of the seal material 50 is also preferably 10% or more and less than 90% of the linear expansion coefficient of the filter frame 10 in a temperature range of 200 to 500° C. The case where the linear expansion coefficient of the seal material 50 is smaller than the linear expansion coefficient of the filter frame 10 is disadvantageous since the aforementioned effect of suppressing the progress of the cracks by appropriately restricting the thermal expansion of the seal material 50 in the longitudinal direction with the first frame material 11 is difficult to achieve. However, the buffer material 60 is disposed to intervene between the seal material 50 and the filter frame 10 as described above, and therefore the effect of suppressing the progress of the cracks can be obtained even though the thermal expansion of the seal material 50 is not restricted by the first frame material 11.

Among the materials of the filter frame 10, for example, stainless has a larger linear expansion coefficient in a high temperature range than that in a low temperature range, and the thermal expansion amount of the filter frame 10 in use of the air filter 1 is larger than that in sintering. Accordingly, in the case where the seal material 50 is in contact with the filter frame 10, the seal material 50 is largely pulled by the filter frame 10, and the cracks of the seal material 50 readily proceed to cause dust emission. In the present embodiment, however, various ceramic materials having a smaller linear expansion coefficient than the stainless can be selected as the seal material 50 while selecting the stainless steel as the material of the filter frame 10, and thus even in this case, the progress of the cracks of the seal material 50 can be suppressed to suppress dust emission.

The buffer material 60 is disposed between the second frame material 12 of the filter frame 10 and the seal material 50 (pleated filter material 20). In the case where the filter frame 10 expands or contracts, the buffer material 60 follows the expansion or contraction thereof, so as to retain the sealability between the pleated filter material 20 and the filter frame 10. The expansion or contraction of the filter frame 10 means the expansion or contraction thereof in the direction in parallel to the surface direction of the filter frame 10 facing the seal material 50. With the buffer material 60 disposed between the seal material 50 and the second frame material 12, the seal material 50 can expand or contract in use of the air filter 1 without being restricted with the filter frame 10 and without being pulled by the filter frame 10.

The buffer material 60 has ends 61 in the horizontal direction. The ends 61 are each extended to the overlap part 15 and held with the first frame material 11 and the second frame material 12.

The buffer material 60 preferably has cushioning property and heat resistance, and is preferably formed, for example, of a fibrous material. The buffer material 60 formed of a fibrous material can readily expand and contact, and thus has a large effect of allowing the seal material 50 to expand or contact along the filter frame 10 (which may also be referred to as a buffer effect). The buffer material 60 formed of a fibrous material does not come into close contact with the filter frame 10, and thus can secure the slipperiness to the filter frame 10. Furthermore, in the case where the buffer material 60 in a compressed state is disposed between the seal material 50 and the filter frame 10, the sealability between the seal material 50 and the filter frame 10 can be obtained with the repulsive force of the fibrous material. The fibrous material may be formed, for example, of glass, ceramics, or minerals. In addition, the buffer material 60 formed of a fibrous material can contract along with the seal material 50 in sintering the seal material 50, and thereby an effect of suppressing the occurrence of cracks of the seal material 50 in sintering can also be obtained. In sintering the seal material 50, the seal material 50 contracts, whereas the filter frame 10 expands. Accordingly, the buffer material 60 intervening between the seal material 50 and the filter frame 10 in sintering is effective therefor.

The ceramics are, for example, a material containing silica, alumina, zirconia, and the like. In the case where a binder is contained in the buffer material 60, there is a concern that the binder is melted or decomposed in use and flows downstream, and therefore, no binder is preferably contained. The average fiber diameter of fibers constituting the fibrous material is, for example, 0.01 to 10 μm. The form of the buffer material 60 is, for example, a cotton-like form or a sponge form (porous form). Examples of the preferred buffer material 60 include glass wool and rock wool.

It is preferred that no other member is disposed between the buffer material 60 and the seal material 50. Examples of the other member include a fibrous material in the form of sheet, such as filter paper and a nonwoven fabric. In the case where the member intervenes between the buffer material 60 and the seal material 50, there is a concern that the effect of suppressing the occurrence of cracks in sintering the seal material 50 is decreased.

The air filter 1 particularly include a step of forming the seal material 50 and a step of disposing the buffer material 60. The step of forming the seal material 50 and the step of disposing the buffer material 60 may be performed, for example, in the manner shown in the items (1) and (2) below.

(1) The buffer material 60 is disposed on the upper surface (inner surface 19) of the second frame material 12 on the lower side of the filter frame 10, and the seal material 50 in the form of paste is coated on the buffer material 60 thus disposed. The pleated filter material 20 and the separator 40 are attached to the coated seal material 50. At this time, the first frame material 11 is preferably bonded to the second frame material 12 on the lower side. Subsequently, the second frame material 12 on the upper side is disposed to make the inner surface 19 thereof upward, which is directed downward to face the second frame material 12 on the lower side in use, and another buffer material 60 is disposed on the surface, followed by coating the seal material 50 in the form of paste on the buffer material 60 thus disposed. The upper end parts of the pleated filter material 20 and the separator 40 are attached to the coated seal material 50. At this time, the first frame material 11 is bonded to the second frame material 12 on the upper side. Subsequently, the resulting non-baked air filter 1 is disposed, for example, in a furnace, and the seal material 50 is sintered.

(2) The seal material 50 in the form of paste is coated on the parts (lower ends) of the pleated filter material 20 and the separator 40, which face the second frame material 12 on the lower side of the filter frame 10. The buffer material 60 is placed on the coated seal material 50, and the second frame material 12 on the lower side is disposed thereon. The assembly is inverted vertically, and the seal material 50 in the form of paste is coated on the parts (upper ends) of the pleated filter material 20 and the separator 40, which face the second frame material 12 on the upper side. Another buffer material 60 is disposed on the coated seal material 50, and the second frame material 12 on the upper side is disposed thereon. The first frame material 11 is preferably bonded to the second frame material 12 on the upper side. Subsequently, the resulting non-baked air filter 1 is disposed, for example, in a furnace, and the seal material 50 is sintered.

The buffer material 60 is preferably disposed, for example, along the entire inner surface 19 of the second frame material 12. The seal material 50 preferably has such a size that does not protrude from the buffer material 60.

In the step of forming the seal material 50, the seal material 50 in the form of paste or liquid may be spontaneously dried, but is preferably sintered at a high temperature. The sintering is performed, for example, in a dry atmosphere at 100 to 200° C. At this time, the temperature is preferably increased to the sintering temperature at a temperature increasing rate of 3 to 16° C./min for suppressing the occurrence of cracks of the seal material 50. It is preferred that the seal material 50 in the form of paste does not contain crystalline silica, contains amorphous silica and alumina, and has a viscosity at room temperature (23° C.) of 20,000 to 50,000 mPa·s, as described above.

In the case where the air filter 1 is produced in this manner, the thickness of the seal material 50 is preferably 3 to 20 mm. The thickness of the seal material 50 is preferably 5 to 15 mm. The thickness of the seal material 50 means the thickness thereof in the dry state (state after sintering). It has been found that the seal material 50 more readily causes cracks in sintering with a smaller thickness thereof. While a large internal stress occurs in the seal material 50 due to the contraction of the seal material 50 at the time when water escapes from the seal material 50 in sintering, it is considered that the thin seal material 50 cannot withstand the large internal stress. On the other hand, a too large thickness of the seal material 50 fails to achieve weight reduction of the air filter 1.

The thickness of the buffer material 60 is preferably 1 to 15 mm. The thickness of the buffer material 60 is particularly preferably 3 to 10 mm.

There may be a large difference in expansion amount or contraction amount in the vertical direction between the pleated filter material 20 and the separator 40 in some cases. In these cases, with a too large thickness of the buffer material 60, the buffer material 60 also contracts in the direction (vertical direction) perpendicular to the direction along the filter frame 10. Therefore, in the case where the buffer material 60 receives forces from the pleated filter material 20 and the separator 40, the cracks inside the seal material 50 readily proceed in the vertical direction to reach the surface of the seal material 50. The seal material 50 thus readily emits dust thereby. In the case where the thickness of the seal material 50 is large, in particular, the number of positions where the dust emission occurs is increased since there are large wall surfaces in the cracked parts of the seal material 50. In the case where the thickness of the buffer material 60 is too large, furthermore, the seal material 50 moves downward due to the own weight thereof to compress the buffer material 60 against the filter frame 10. Accordingly, a gap occurs on the opposite side, i.e., between the buffer material 60 facing the second frame material 12 on the upper side and the second frame material 12 on the upper side, which causes a concern that leak occurs. This problem becomes conspicuous particularly in the case where the thickness of the seal material 50 is large. In this standpoint, the ratio of the thickness of the seal material 50 with respect to the thickness of the buffer material 60 is preferably 1 or more, and more preferably 1.2 or more.

In the case where the thickness of the buffer material 60 is too small, on the other hand, there are cases where the seal material 50 locally reaches the filter frame 10 and comes into contact with the filter frame 10, in coating the seal material 50 in the form of paste. In these cases, the buffer function of the buffer material 60 is restricted to cause a concern that the progress of the cracks of the seal material 50 cannot be sufficiently suppressed. In the case where the thickness of the buffer material 60 is too small, the repulsive force thereof under compression between the seal material 50 and the filter frame 10 is weak, and a gap occurs between the seal material 50 and the filter frame 10 to cause leak in some cases. From this standpoint, the aforementioned ratio is preferably 5 or less, and more preferably 3 or less.

The thickness of the buffer material 60 means the average value of the thicknesses measured at plural (three or more) positions along the longitudinal direction (horizontal direction) of the buffer material 60 disposed between the seal material 50 and the filter frame 10. The thickness of the buffer material 60 can be measured, for example, with a vernier caliper.

The filter frame 10 has a corner part 16 formed in the overlap part 15. The corner part 16 is formed on the side of the inner surface 19 of the filter frame 10, and is a part where the first frame material 11 and the second frame material 12 perpendicularly cross each other. On the corner part 16, the pleated filter material 20 is disposed gas tightly on the filter frame 10 via the buffer material 60 and the seal material 50. However, more than a little gap is formed between the corner part 16 and the buffer material 60 or the seal material 50, resulting in a concern that air leak occurs at the corner part 16. In the case where the filter frame 10 is formed of a metal, in particular, there is a concern that air leak occurs.

In the air filter 1 of the present embodiment, on the other hand, the buffer material 60 is extended to the overlap part 15 and held with the first frame material 11 and the second frame material 12. According to the configuration, the buffer material 60 can favorably prevent the formation of the gap and can suppress the air leak. As a result, the air filter 1 can suppress the decrease in trapping efficiency occurring locally at the corner part 16.

Furthermore, only the dimensional change of the buffer material 60 provided for buffering is performed without use of another configuration, and therefore the air leak at the corner part 16 can be readily prevented without increasing the number of components of the air filter 1.

While some embodiments of the present invention have been described, the embodiments are merely shown as examples, and do not intend to restrict the scope of the invention. These novel embodiments can be practiced by various other modes, and various omissions, substitutions, and changes may be made therein unless they deviate from the substance of the present invention. These embodiments and modifications thereof are encompassed in the scope and the substance of the present invention, and are also encompassed in the inventions described in the claims and the equivalent ranges thereof.

For example, the buffer material 60 may be provided between the pleated filter material 20 and the first frame material 11, and may be provided between the pleated filter material 20 and both the first frame material 11 and the second frame material 12. The buffer material 60 may also have the function of the seal material 50.

The seal material 50 may be constituted, for example, by a geopolymer, glass wool, or urethane, other than the ceramic material.

Figure 5:
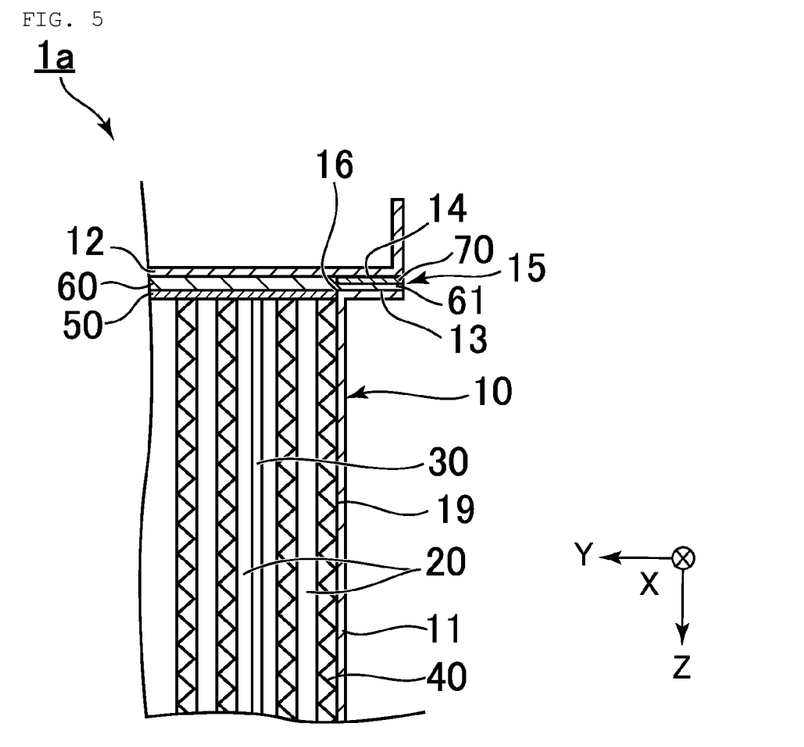
FIG. 5 is a cross sectional view showing an air filter as a modified example corresponding to FIG. 3.

The air filter 1 may include a filling material used in the overlap part 15 for further reducing the air leak. FIG. 5 is a cross sectional view showing an air filter 1a as a modified example corresponding to FIG. 3. The configurations and the parts thereof corresponding to the air filter 1 are attached with the same symbols, and redundant descriptions therefor are omitted.

The air filter 1a includes a filling material 70 that is further disposed in the overlap part 15 in addition to the buffer material 60. Specifically, the filling material 70 is held between the first frame material 11 and the second frame material 12 in the overlap part 15, and fills the gap in the overlap part 15. The filling material 70 is formed of a material capable of filling the gap in the overlap part 15, and is formed, for example, of the similar filter paper to the pleated filter material 20, a sintered article of long fibers, or a foamed article.

The filling material 70 may be disposed between the buffer material 60 and the second frame material 12. In alternative, the filling material 70 may be disposed between the separator 40 and the first frame material 11. The filling material 70 is preferably disposed on the buffer material 60 in the overlap part 15 on the side of the first frame material 11 and the bolt for clamping the first frame material 11. In clamping with the bolt, there is a concern that the fibers of the buffer material 60 are entangled on the bolt, inhibiting the clamping and releasing of the bolt. The filling material 70 is disposed between the bolt and the buffer material 60, thereby preventing the buffer material 60 from being entangled on the bolt in inserting the bolt. The filling material 70 presses the fibers of the buffer material 60 for preventing the fibers of the buffer material 60 entangled on the bolt from being taken out along with the bolt in releasing the bolt.

The air filter 1a includes both the filling material 70 and the buffer material 60 existing in the overlap part 15, and thereby the gap in the overlap part 15 is filled more effectively to prevent the air leak than the air filter 1.

Figure 6:
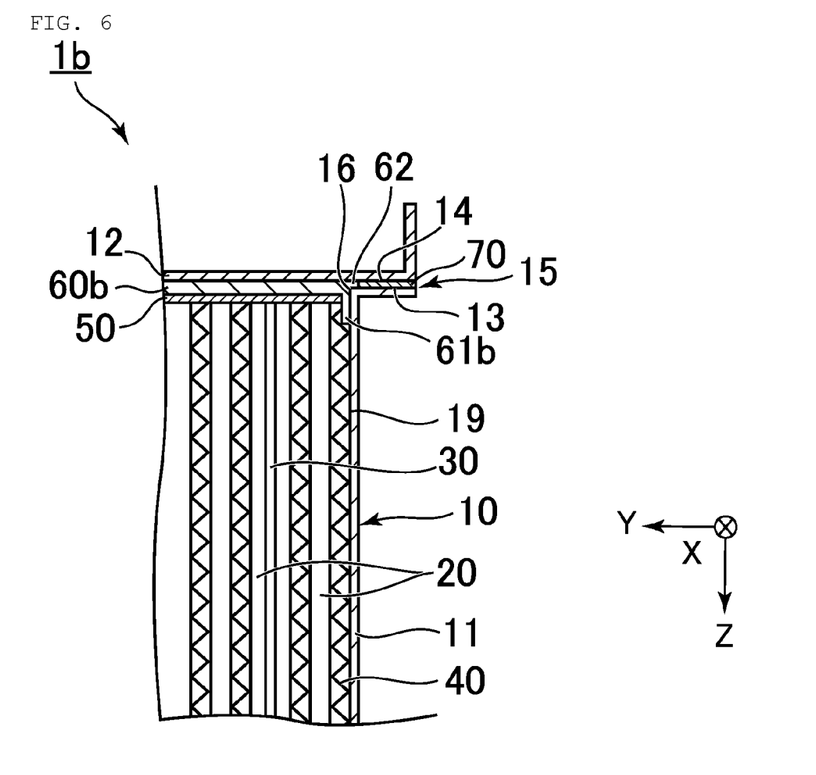
FIG. 6 is a cross sectional view showing an air filter as another modified example corresponding to FIG. 3.

FIG. 6 is a cross sectional view showing an air filter 1b as another modified example corresponding to FIG. 3. An air filter 1b includes a buffer material 60b having an end part 61b that is folded along the shape of the inner surface 19 of the filter frame 10 for further reducing the air leak. Specifically, the buffer material 60b has an angle part 62 formed by folding the end part 61b to the downward direction or the upward direction along the gas flow direction. The buffer material 60b is collapsed due to the cushioning property thereof in fabricating to form the overlap part 15 with the first frame material 11 and the second frame material 12, so that the a part of the angle part 62 is held in the overlap part 15. According to the configuration, the buffer material 60b securely covers the corner part 16 and the gap between the pleated filter material 20 and the seal material 50, and thereby the air leak occurring from the corner part 16 can be further suppressed. The filling material 70 is disposed in the overlap part 15.

While the embodiment has been described in which the cutout part 35 is formed in a semicircular shape, and the contact parts 36 are formed on one pair of edges 32 along the gas flow direction, the shape of the cutout part 35 is not particularly limited. For example, plural cutout parts 35 may be provided on one pair of edges 32 along the gas flow direction, and the cutout part 35 may have a rectangular shape or a polygonal shape, but not a semicircular shape.

Figure 7:
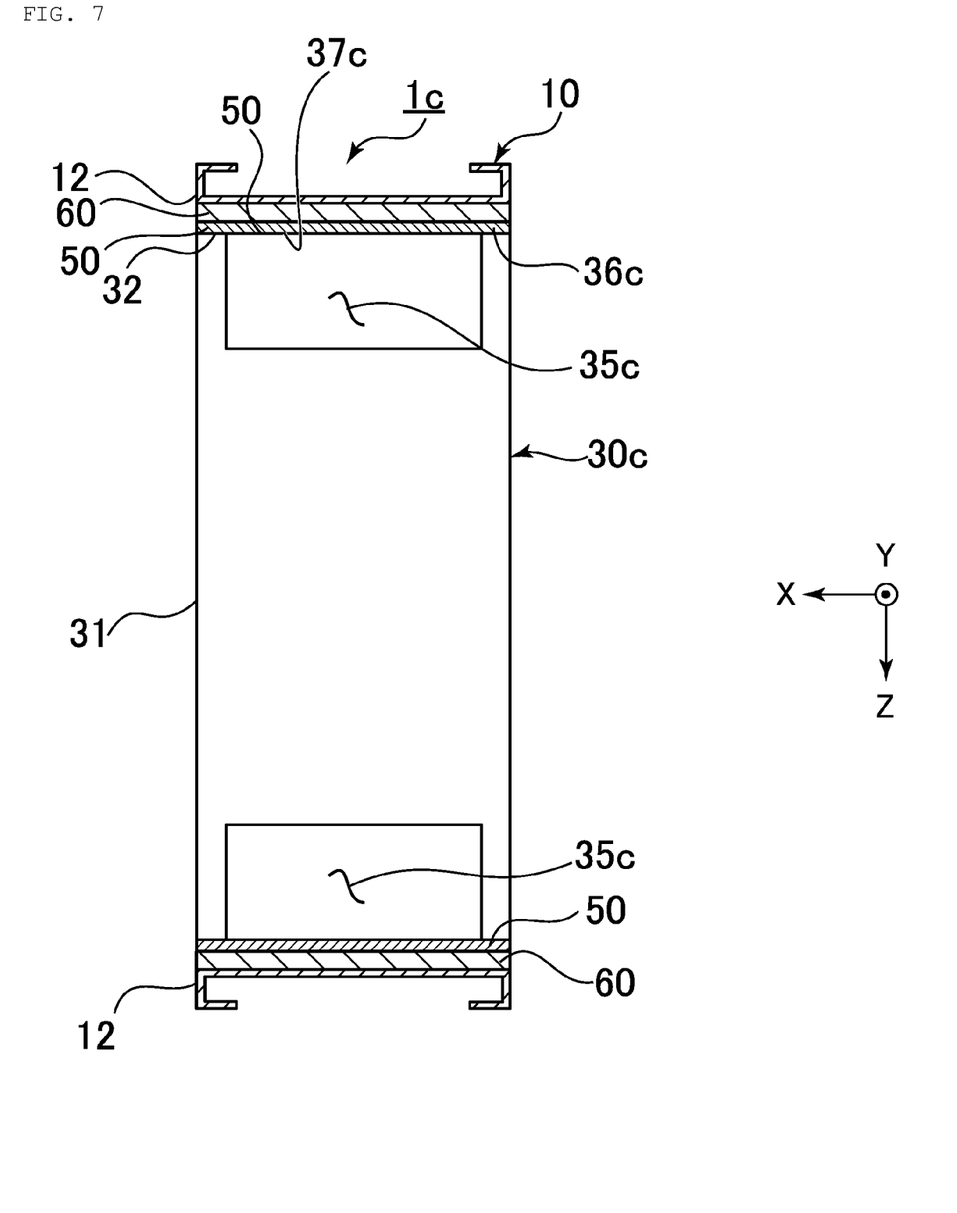
FIG. 7 is a cross sectional view of an air filter along the vertical direction for describing another reinforcing plate corresponding to FIG. 4.

FIG. 7 is a cross sectional view of an air filter 1c along the vertical direction for describing another reinforcing plate 30c corresponding to FIG. 4. The configurations and the parts thereof corresponding to the air filter 1 are attached with the same symbols, and redundant descriptions therefor are omitted.

The reinforcing plate 30c has cutout parts 35c each having an approximately rectangular shape, so as to form contact parts 36c and a non-contact part 37c on each of one pair of edges 32 along the gas flow direction. At the time when the air filter 1c is at a high temperature, it is considered that the expansion of the reinforcing plate 30c at the cutout part 35c occurs in the directions perpendicular to the edges constituting the periphery of the cutout part 35c, i.e., in the vertical direction and the gas flow direction. According to the configuration, the contact parts 36c can be reduced, and the thrust of the reinforcing plate 30c onto the seal material 50 can be reduced similarly to the reinforcing plate 30. Consequently, the breaking of the seal material 50 in the air filter 1c can be prevented.

It is considered that the linear part constituting the periphery of the cutout part thermally expands in the direction perpendicular to the linear direction thereof, and the curved part thermally expands in the centrifugal directions. In the case where one pair of edges 32 along the gas flow direction each are cutout in a semicircular shape, it is considered that the reinforcing plate thermally expands in the centrifugal directions from the cutout part (i.e., in the directions not along the vertical direction), and thereby the force pressing the seal material 50 in the vertical direction is dispersed and reduced. According to the configuration, the reinforcing plate can further prevent the breaking of the seal material 50 in the case where the cutout part 35 having a semicircular shape having no part perpendicular to the vertical direction is provided.

The pleated filter material 20 comes into surface contact at end parts in the horizontal direction with each of the first frame materials 11 through thrust of the separator 40 as described above, and a presser plate may be provided for further sealing the contact surface.

Figure 8:
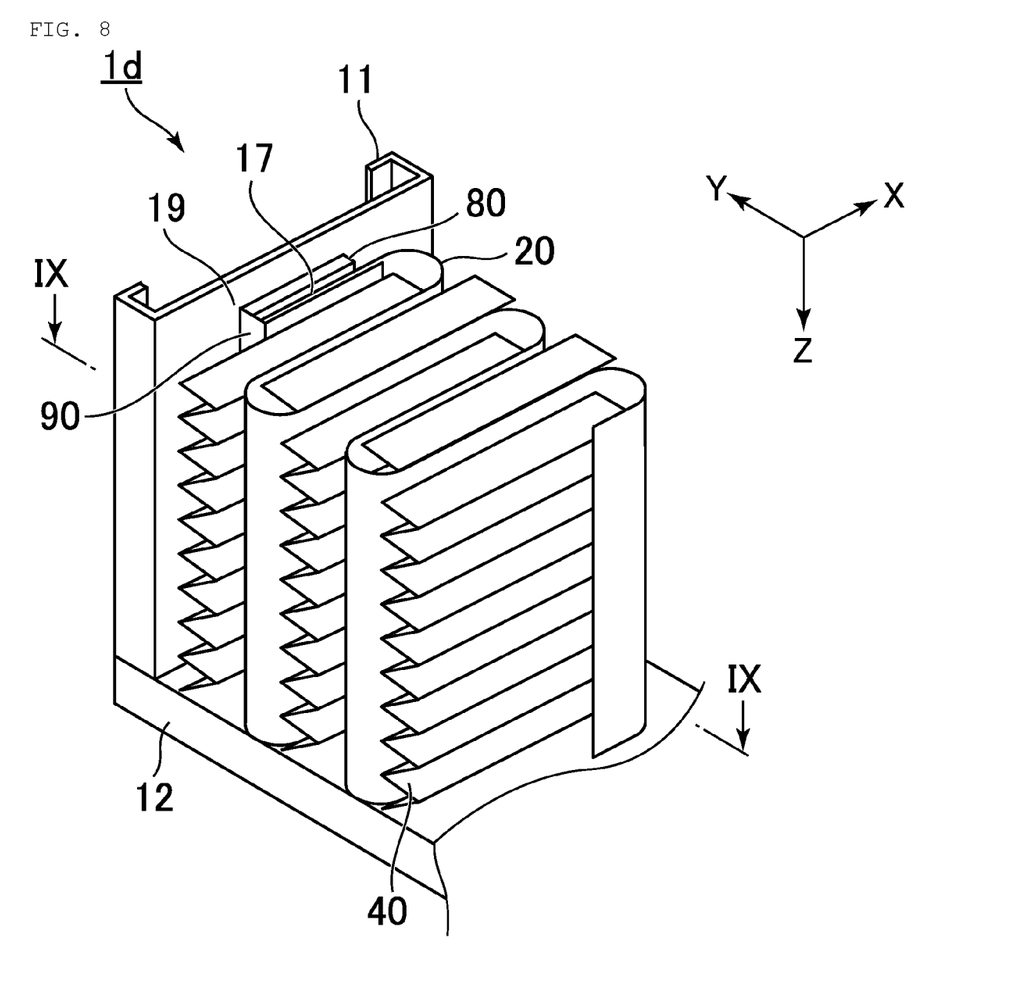
FIG. 8 is an illustrative view showing an air filter having a presser plate.
Figure 9:
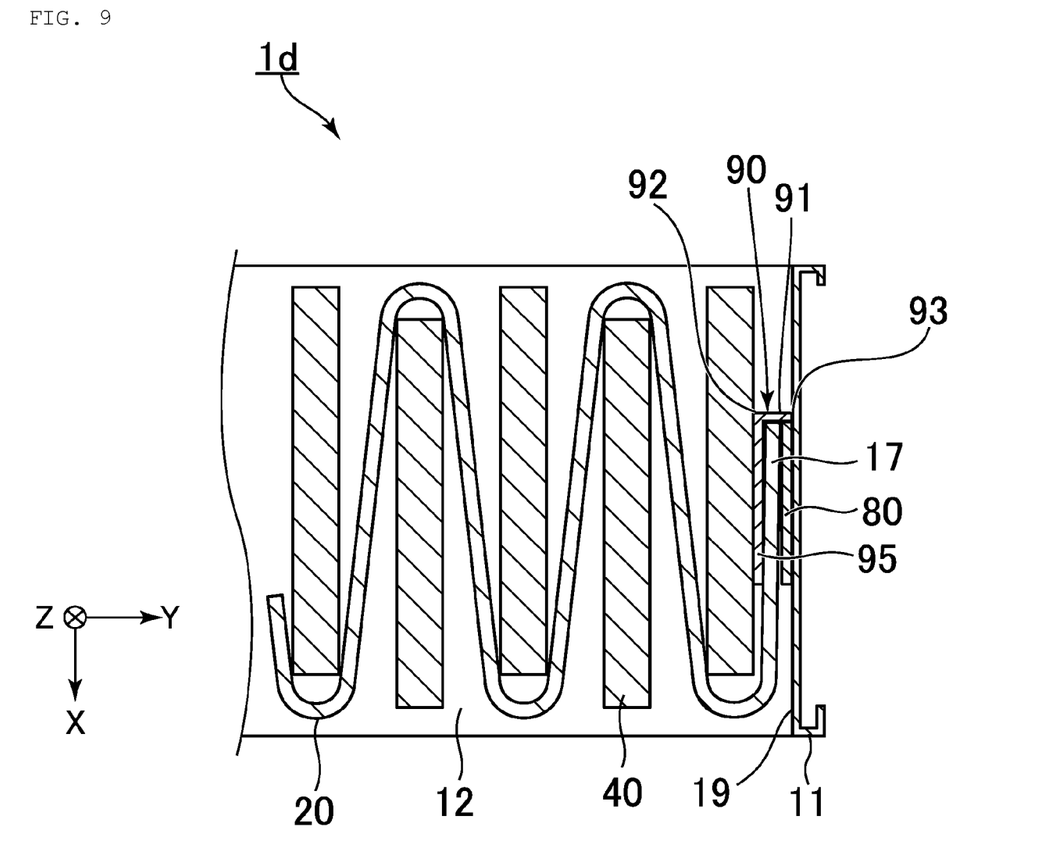
FIG. 9 is a cross sectional view on the line IX-IX in FIG. 8.

FIG. 8 is an illustrative view showing an air filter 1d having a presser plate 90. FIG. 9 is a cross sectional view on the line IX-IX in FIG. 8. In FIG. 8, for convenience of explanation, the first frame material 11 and the second frame material 12 are partially omitted from the illustration. The configurations and the parts thereof corresponding to the air filter 1 are attached with the same symbols, and redundant descriptions therefor are omitted.

The air filter 1d further includes, as compared with the air filter 1, a right and left side seal material 80 and a presser plate 90.

The right and left side seal material 80 (third seal material) seals between a part on the inner surface 19 of each of the first frame material 11 and an end part 17 in the horizontal direction of the pleated filter material 20 facing the part of the inner surface 19. The right and left side seal material 80 is formed of the same material as the seal material 50 or glass fibers.

The presser plate 90 compresses and holds the end part 17 of the pleated filter material 20 and the right and left side seal material 80, which are closely in contact with the first frame material 11 thereby. The presser plate 90 is formed of a thin plate of a metal, such as stainless, that is folded to have an L-shape viewed in the vertical direction. The presser plate 90 includes a rise part 91 and a press part 95.

The rise part 91 is disposed perpendicularly to the inner surface 19 of the first frame material 11. The rise part 91 is disposed perpendicularly to the gas flow direction to cover the boundary between the right and left side seal material 80 and the end part 17 viewed from the upstream side. The rise part 91 has approximately the same vertical length as the vertical length of the pleated filter material 20. The rise part 91 has a smaller horizontal length than the thickness (horizontal length) of the right and left side seal material 80 and the pleated filter material 20 under no load.

The press part 95 is a part that is formed by folding from an end part 92, which is one of end parts in the horizontal direction of the rise part 91 that is located separately from the first frame material 11, to the downstream side approximately perpendicularly to the rise part 91. The press part 95 is inserted between the end part 17 and the separator 40 disposed in the valley part formed by the pleated filter material 20 including the end part 17.

In the presser plate 90, for example, an end part 93, which is one of end parts in the horizontal direction of the rise part 91 that is located on the side of the first frame material 11, is fixed to the inner surface 19 of the first frame material 11. The presser plate 90 is fixed with various fixing means, such as welding and a screw. The presser plate 90 is preferably fixed through welding, for reducing the gap between the inner surface 19 and the presser plate 90.

The presser plate 90 forms a housing space with the inner surface 19 of the first frame material 11, the rise part 91, and the press part 95. The horizontal length of the rise part 91 is set to a smaller value than the thickness of the right and left side seal material 80 and the pleated filter material 20, as described above. According to the configuration, the presser plate 90 houses in the housing space thereof the pleated filter material 20 and the right and left side seal material 80 under compression with the press part 95 in the direction toward the inner surface 19. The right and left side seal material 80 and the pleated filter material 20 are pressed onto the inner surface 19 of the first frame material 11. According to the configuration, sealability can be obtained in the gaps among the inner surface 19 of the first frame material 11, the right and left side seal material 80, and the pleated filter material 20, and dust can be suppressed from entering into the gap between the first frame material 11 and the right and left side seal material 80. The voids in the fibers of the right and left side seal material 80 formed of a fibrous material can be reduced by compressing the right and left side seal material 80, thereby increasing the sealability.

In the case where the end part 17 of the pleated filter material 20 is extended from the upstream side to the downstream side toward the tip thereof, it suffices that the presser plate 90 is disposed in such a manner that the rise part 91 covers the boundary between the right and left side seal material 80 and the end part 17 viewed from the downstream side. The vertical length of the presser plate 90 may be shorter than the vertical length of the pleated filter material 20, and the presser plate 90 may be disposed by dividing along the vertical direction.

The shape of the presser plate 90 is not limited to the above, and another shape may be used as far as sealability can be imparted to gaps among the inner surface 19 of the first frame material 11, the right and left side seal material 80, and the pleated filter material 20.

Figure 10:
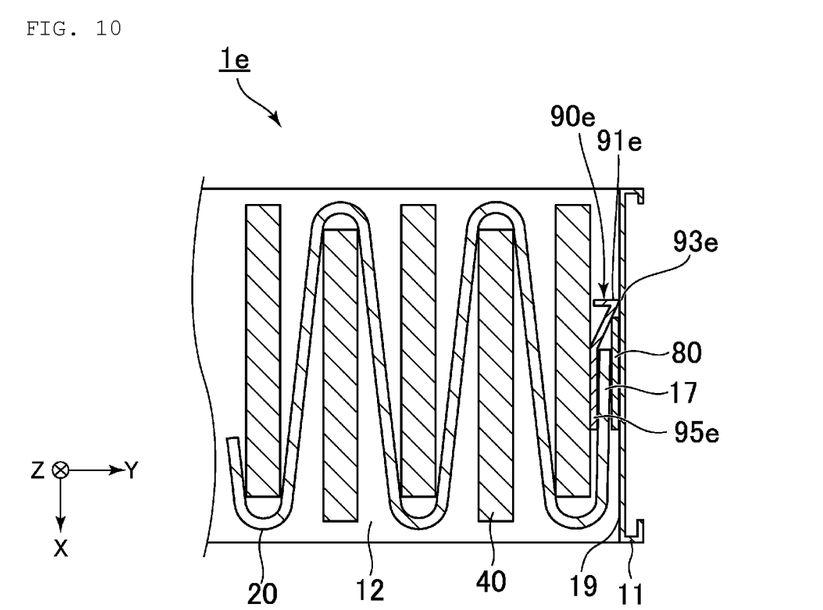
FIG. 10 is a cross sectional view of an air filter having another presser plate corresponding to FIG. 9.

For example, FIG. 10 is a cross sectional view of an air filter 1e having another presser plate 90e corresponding to FIG. 9. The configurations and the parts thereof corresponding to the air filter 1 are attached with the same symbols, and redundant descriptions therefor are omitted.

The presser plate 90e includes a rise part 91e and a press part 95e. The rise part 91e is disposed perpendicularly to the inner surface 19 of the first frame material 11. The rise part 91e is disposed perpendicularly to the gas flow direction to cover the boundary between the right and left side seal material 80 and the end part 17 viewed from the upstream side, along with the press part 95e. The rise part 91e has approximately the same vertical length as the vertical length of the pleated filter material 20.

The press part 95e is a part that is formed by folding from an end part 93e, which is one of end parts in the horizontal direction of the rise part 91e that is located on the side of the first frame material 11, to the downstream side. The press part 95e is folded in such a manner that it gradually opens in the direction away from the inner surface 19 of the first frame material 11. According to the configuration, the press part 95e functions as a leaf spring pressing the end part 17 and the right and left side seal material 80 onto the inner surface 19.

The presser plate 90e forms a housing space with the inner surface 19 of the first frame material 11 and the press part 95e. The horizontal length of the housing space (distance from the inner surface 19) is gradually increased along the gas flow direction. The presser plate 90e has a larger force pressing the right and left side seal material 80 and the pleated filter material 20 onto the inner surface 19 than the presser plate 90 due to the spring property thereof, and thus can further enhance the sealability.

Figure 11:
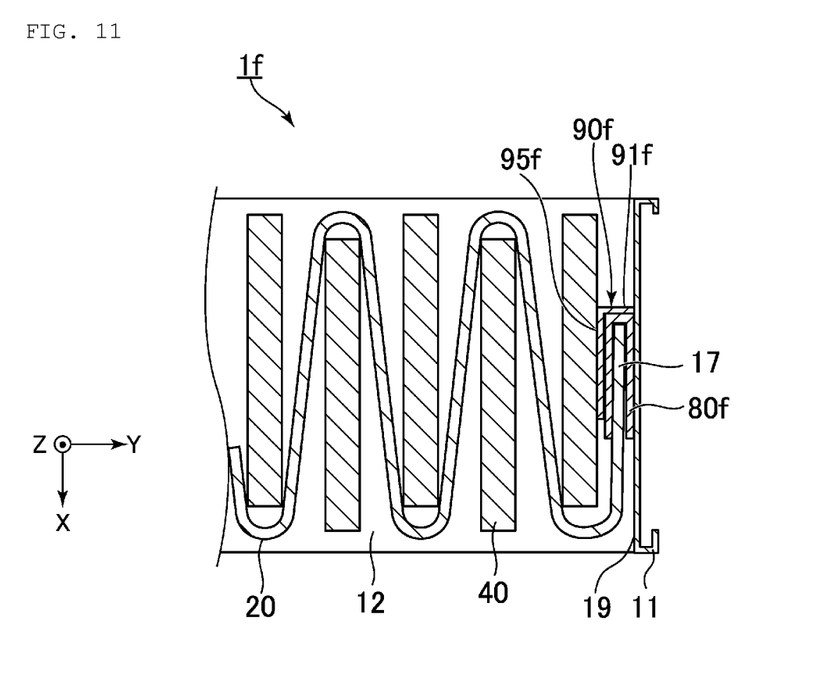
FIG. 11 is a cross sectional view of an air filter having another right and left side seal material corresponding to FIG. 9.

For further enhancing the sealability in the air filter 1e, the right and left side seal material 80 may be disposed between the presser plate 90 and the pleated filter material 20. For example, FIG. 11 is a cross sectional view of an air filter 1f having another right and left side seal material 80f corresponding to FIG. 9.

The right and left side seal material 80f is disposed between the first frame material 11 and the pleated filter material 20, and is also disposed between the pleated filter material 20 and the press part 95f by folding at the tip of the end part 17. According to the configuration, the thickness of the right and left side seal material 80 housed in the housing space is increased to enhance the compression rate of the right and left side seal material 80. Accordingly, the presser plate 90f can have a larger force pressing the right and left side seal material 80 and the pleated filter material 20 down onto the inner surface 19, and thus can further enhance the sealability.

REFERENCE SIGN LIST 1, 1a, 1b, 1c, 1d, 1e, 1f: Air filter
10: Filter frame
11: First frame material
12: Second frame material
13, 14, 17: End part
15: Overlap part
16: Corner part
19: Inner surface
20: Pleated filter material
21: Folding line
30, 30c: Reinforcing plate
31: One pair of edges along vertical direction
32: One pair of edges along gas flow direction 35, 35c: Cutout part
36, 36c: Contact part
37, 37c: Non-contact part
40: Separator
50: Seal material
60, 60b: Buffer material
61, 61b: End part
62: Angle part
70: Filling material
80, 80f: right and left side seal material
90, 90e, 90f: Presser plate
91, 91e: Rise part
92: End part
93, 93e: End part
95, 95e, 95f: Press part

The invention claimed is:

1. An air filter comprising:
a pleated filter material folded into a zig-zag form at folding lines along a first direction to have peak parts and valley parts arising alternately in a second direction perpendicular to the first direction, trapping fine particles in a gaseous matter flowing in a gas flow direction perpendicular to the first direction and the second direction;
a filter frame being a rectangular filter frame including one pair of first frame materials facing each other in the second direction having end parts in the first direction, and one pair of second frame materials facing each other in the first direction having end parts in the second direction, opening in the gas flow direction and housing the pleated filter material, each of the first frame materials and each of the second frame materials being combined to provide an overlap part where each of the end parts of each of the first frame materials and each of the end parts of each of the second frame materials overlap each other;
a buffer material disposed between at least each of the second frame materials of the filter frame and the pleated filter material, held with the overlap part; and
a seal material sealing between at least a part of an inner surface of the filter frame and a part of the pleated filter material facing the part of the inner surface, the seal material containing a ceramic material having a ratio of a linear expansion coefficient of the seal material in a temperature range of 200 to 500° C. of 10 to 200% with respect to a linear expansion coefficient of the filter frame in the temperature range, wherein
the buffer material is disposed to intervene between the seal material and the filter frame, and allows the seal material to expand or contract along the filter frame.

2. The air filter according to claim 1, wherein the air filter further comprises a filling material held along with the buffer material, between each of the end parts in the first direction of each of the first frame materials and each of the end parts in the second direction of each of the second frame material, in the overlap part.

3. The air filter according to claim 1, wherein
the buffer material has an angle part formed by folding along a shape of an inner surface of the filter frame, and
at least a part of the angle part is held between each of the end parts in the first direction of each of the first frame materials and each of the end parts in the second direction of each of the second frame material, in the overlap part.

4. The air filter according to claim 1, further comprising:
a reinforcing plate having an approximately rectangular shape having one pair of edges along the first direction and one pair of edges along the gas flow direction, inserted to the multiple valley parts between the peak parts adjacent to each other to support, in the first direction, a position of the pleated filter material in the first direction; and
a seal material sealing a gap between each of the end parts in the first direction of the pleated filter material and the filter frame, wherein
the one pair of edges along the gas flow direction of the reinforcing plate each have a contact part in contact with the seal material, and a non-contact part not in contact therewith.

5. The air filter according to claim 1, further comprising:
a seal material sealing between a part of an inner surface of each of the first frame materials and a part of the pleated filter material facing the part of the inner surface; and
a presser plate compressing and pressing the part of the pleated filter material facing the part of the inner surface and the seal material down onto the inner surface.

6. The air filter according to claim 2, wherein
the buffer material has an angle part formed by folding along a shape of an inner surface of the filter frame, and
at least a part of the angle part is held between each of the end parts in the first direction of each of the first frame materials and each of the end parts in the second direction of each of the second frame material, in the overlap part.

* * * * *